April 12, 1966  R. L. JOHNSON  3,246,115
ARC COMPOUNDED COMBUSTION AND FLAME ARRANGEMENT
Filed June 3, 1963
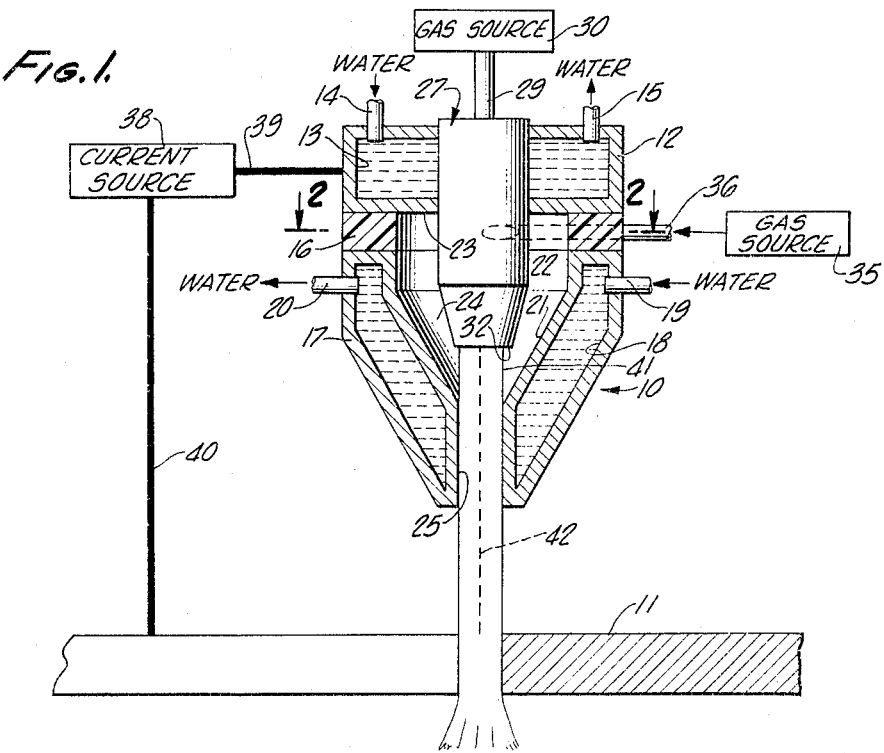
Fig. 1.
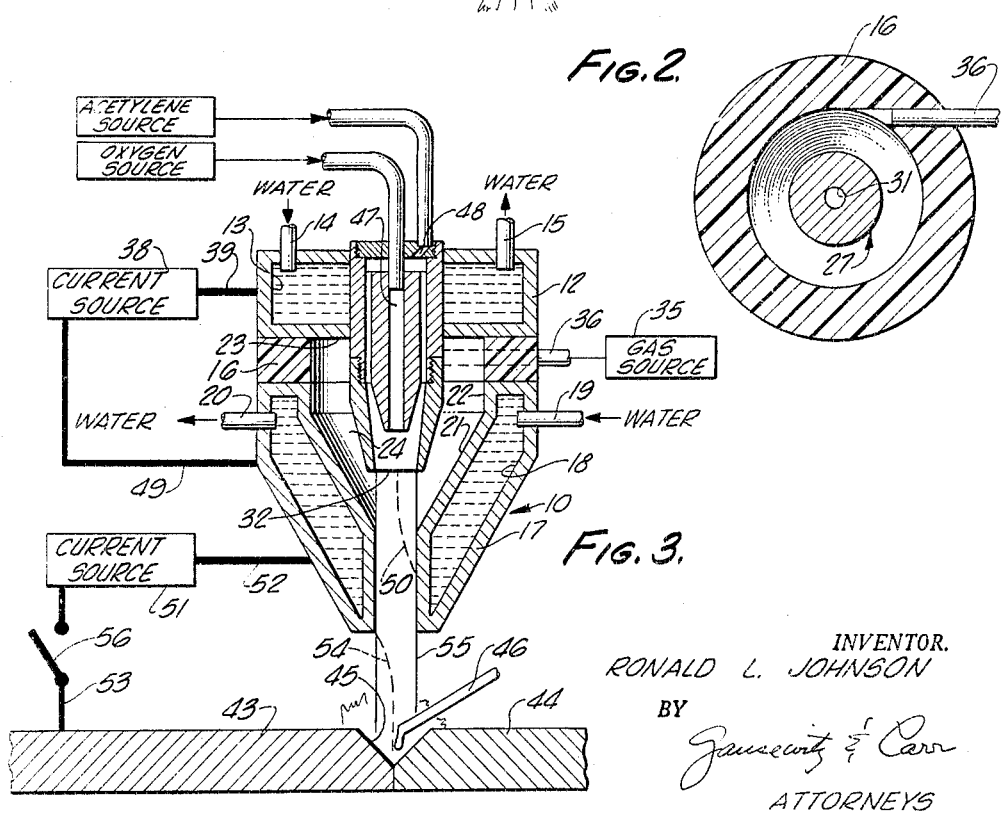
Fig. 2.
Fig. 3.
INVENTOR.
RONALD L. JOHNSON
BY
*Gausewitz & Carr*
ATTORNEYS

United States Patent Office 3,246,115
Patented Apr. 12, 1966

3,246,115
ARC COMPOUNDED COMBUSTION AND FLAME ARRANGEMENT
Ronald L. Johnson, Costa Mesa, Calif., assignor, by mesne assignments, to Giannini Scientific Corporation, Long Island, N.Y., a corporation of California
Filed June 3, 1963, Ser. No. 284,895
1 Claim. (Cl. 219—121)

This invention pertains to a method and means for cutting, welding and surface treating, utilizing a gas flame augmented by an electric arc.

According to the provisions of this invention, a gas torch produces a flame which is supplemented by an electric arc. Provision is made to constrict the arc to result in an intense arc column. Among the ways of constricting the arc are the use of mechanical boundaries, and by producing a vortical flow of gas around the arc and combustion flames. Electrical potentials and magnetic coils may be used for this purpose also. As a result, the unit produces a very high amount of concentrated thermal energy. A partial ionization of the gases takes place as the electrical energy of the arc is transferred into thermal energy. The result is a unit capable of performing a variety of functions and operable at faster rates than conventional units. The combination of the arc with the combustion flames under some circumstances will substantially reduce the quantity of combustion gases needed as compared with requirements of conventional gas welding or cutting.

Accordingly, it is an object of this invention to provide a rapid and highly efficient arrangement for welding, cutting, surface treating and the like.

Another object of this invention is to provide greater heat for welding, cutting and surface treating than can be obtained with conventional techniques.

A further object of this invention is to provide an arrangement utilizing combustion flames in which the input requirements for the combustible mixture are reduced.

A further object of this invention is to provide an arc augmented combustion flame arrangement having a stabilized arc.

These and other objects will become apparent from the following detailed description taken in connection with the accompanying drawing in which:

FIGURE 1 is a sectional view of the arrangement of this invention utilized in a cutting operation, FIGURE 2 is a transverse sectional view taken along line 2—2 of FIGURE 1, and FIGURE 3 is a sectional view of the invention as used for welding in which a welding rod is applied.

With reference to the drawing, in particular to FIGURES 1 and 2, the arrangement of this invention may include a unit 10 intended for cutting a workpiece 11. Frequently the workpiece will be a ferrous metal, although the invention is not limited to use with such materials. The unit 10 includes a housing having an upper portion 12 defining a passageway 13 for a coolant such as water. Hence, the coolant enters the chamber 13 through an inlet 14 and is exhausted through an outlet 15. At the lower edge of the upper portion 12 of the housing is an annular member 16 of insulating material. This electrically insulates the upper housing section 12 from the lower portion 17. The housing section 17 likewise includes a passageway 18 through which a coolant may flow. Water inlet 19 allows the coolant to enter the passageway 18, while oppositely arranged outlet 20 exhausts the coolant. The lower portion of the housing section 17 is convergent and includes a frustoconical inner wall 21. This, together with cylindrical wall 22 defined by the members 16 and 17, as well as the bottom wall 23 of the upper housing portion 12, defines a chamber 24 within the housing. At the lower end of the housing 11 is axially arranged aperture 25 that communicates with the chamber 24.

Extending axially into the housing 11 in alignment with the opening 25 is a gas torch 27, connecting through inlet line 29 to a gas source 30. A central aperture 31 extends through the torch 27 to the tip 32. Hence, the torch 27 forms a nozzle, and when premixed combustion gases are conducted through opening 31, burning can take place exteriorally of the tip 32 at the outlet of the torch 27.

An additional gas source 35 communicates with the upper end of the chamber 24 through inlet tube 36. As best seen in FIGURE 2, the tube 36 discharges along the circumferential wall 22 of the chamber 24 so that the gases enter the chamber tangentially in a rotating pattern. The gas source 35 normally will supply an inert gas such as argon, nitrogen or helium. Alternatively, for certain purposes a combustible gas may be furnished by the gas supply means 35.

A current source 38 through conductor 39 connects to the upper housing portion 12. An additional lead 40 connects to the workpiece 11.

As a result of this construction, a flame 41 may be produced at the exterior of the tip 32 of the torch 27 as the combustible mixture from the supply 30 is fed into the unit through line 29. At the same time, upon the passing of current through the conductors 39 and 40, an arc 42 may be struck between the torch 27 and the workpiece 11. In other words, the end of the torch assembly 27 forms a part of the electrical circuit and acts as the back electrode for the arc. The arc then jumps across the workpiece 11 which is of opposite polarity. Thus, there results a combination of the flame 41 from the burning gases at the tip 32, together with the arc 42 produced by the electrical circuit.

In addition, gas may enter chamber 24 from inlet tube 36, rotating rapidly within the chamber 24 and discharging along frustoconical wall 21 and the axial outlet 25. The rotation of this gas as it leaves the chamber in this manner constricts the arc 42. As a consequence there is produced an arc of great stability that, as illustrated, will extend substantially rectilinearly from the back electrode to the workpiece within the flame 41.

By this arrangement it is possible to achieve efficiency and heat content not possible with conventional techniques. The combination of the gas flame and the electric arc produces an intense heat at the workpiece 11. Therefore, the workpiece 11 may be raised to its combustion temperature quite rapidly. Consequently, the cutting action can take place at a much faster rate than obtained by previously known cutting procedures. The heat produced is so large that in some instances it is possible to significantly reduce the gas consumption at the torch 27 compared with that of a conventional cutting torch. Utilization of the stabilized arc in conjunction with the exothermic reaction of the burning of the workpiece 11 (when of ferrous metal) can be made to sustain reaction without preheating as in conventional gas cutting operations.

While illustrated in FIGURE 1 as a transferred arc design, including the workpiece 11 in the circuit, a non-transferred arc also is possible with this arrangement. In such instance the conductor 40 would be connected to the housing section 11, and the arc would extend from the tip 32 to the housing portion 11 at the opening 25. Thus, the invention contemplates variations in the circuitry employed.

As illustrated in FIGURE 3 the invention is utilized in welding rather than in cutting as in the illustration of FIGURES 1 and 2. Here workpieces 43 and 44 are in abutting engagement at their edges and together define a V-groove 45 which is to be filled in as the weld takes place. A welding rod 46 is used in supplying molten metal to fill in the groove 45 and unite with the parent metal of the workpieces 43 and 44. In this version, separate sources for the combustion gas and oxidizer are provided, conducted through the torch via openings 47 and 48, respectively. The oxidizer normally will be supplied at the center with the combustion gas passing through several smaller openings around the central aperture.

As shown in FIGURE 3 the current source 38 connects as before through lead 39 to the upper housing section 12. The other lead 49 connects to the lower housing 17, which thereby acts as the front electrode generally as discussed above. Consequently, there is an arc 50 between the tip 32 and the wall of housing section 17 at the opening 25.

It is possible to add an additional electrical circuit into the unit making it a transferred arc type. Hence, there is a current source 51 that extends through conductor 52 to the housing portion 17 and through conductor 53 to the workpiece 43. The result is an arc 54 which may travel to the work along the flame 55. The housing section 17 acts as the back electrode for this arc. A switch 56 is shown in the conductor 53 demonstrating the optional nature of this second electrical circuit. Of course, the use of the additional current source adds to the consumption of electrical energy, but also can increase the thermal energy found in the output of the unit, thus adding to the usable heat content of the arc and plasma at the location of the work.

The foregoing detailed description is to be clearly understood as given by way of illustration and example only, the spirit and scope of this invention being limited solely by the appended claim.

I claim:
Apparatus for heating a workpiece, which comprises:
a gas torch including a gas tip adapted to discharge gas,
said gas tip including means to mix with each other oxidizer and combustion gases,
a nozzle mounted coaxially of said gas tip,
container means containing gas adapted to serve as a plasma medium,
said container means comprising a container of oxidizer gas and a container of combustion gas,
means to pass gas from said container means to and through said gas tip and thence through the nozzle passage in said nozzle, and
means to maintain in said gas and in at least a portion of said nozzle passage an electric arc adapted to form a plasma and adapted to maintain said gas in ignited condition,
said ignited gas and plasma discharging from said nozzle passage for application to a workpiece.

References Cited by the Examiner
UNITED STATES PATENTS

| | | | |
|---|---|---|---|
| 3,064,114 | 11/1962 | Crosswell et al. | 219—76 X |
| 3,082,314 | 3/1963 | Arata et al. | 219—75 |
| 3,122,212 | 2/1964 | Karlovitz. | |
| 3,149,222 | 9/1964 | Giannini et al. | 219—121 |
| 3,153,133 | 10/1964 | Ducati | 219—121 |

RICHARD M. WOOD, *Primary Examiner.*
JOSEPH V. TRUHE, *Examiner.*